Figure 1:
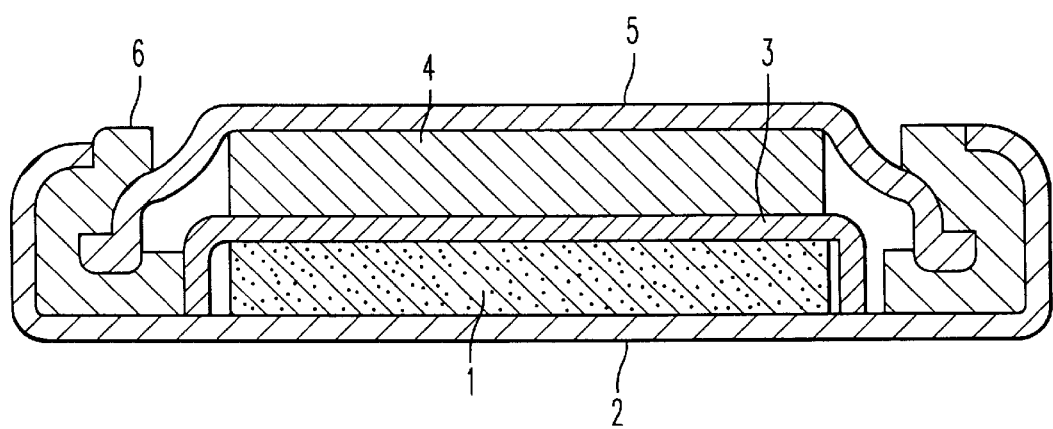

United States Patent

Wada et al.

[11] Patent Number: 5,866,279
[45] Date of Patent: Feb. 2, 1999

[54] NONAQUEOUS ELECTROLYTE SECONDARY CELL

[75] Inventors: Hiroshi Wada; Kenji Shizuka, both of Yokohama, Japan

[73] Assignee: Mitsubishi Chemical Corporation, Tokyo, Japan

[21] Appl. No.: 819,708

[22] Filed: Mar. 18, 1997

[30] Foreign Application Priority Data

| Mar. 19, 1996 | [JP] | Japan | 8-062616 |
| May 21, 1996 | [JP] | Japan | 8-125574 |
| May 15, 1996 | [JP] | Japan | 8-120068 |
| Jul. 5, 1996 | [JP] | Japan | 8-176516 |
| Dec. 26, 1996 | [JP] | Japan | 8-347527 |

[51] Int. Cl.$^6$ .................................................. H01M 4/50
[52] U.S. Cl. ........................................ 429/224; 423/599
[58] Field of Search ............................ 429/224; 423/599

[56] References Cited

U.S. PATENT DOCUMENTS

| 4,828,834 | 5/1989 | Nagaura et al. | 429/224 X |
| 5,641,465 | 6/1997 | Ellgen et al. | 429/224 X |
| 5,683,835 | 11/1997 | Bruce | 429/224 |
| 5,693,307 | 12/1997 | Bowden et al. | 423/599 |
| 5,716,737 | 2/1998 | Hasegawa et al. | 429/224 |

FOREIGN PATENT DOCUMENTS

| 0 712 173 | 5/1996 | European Pat. Off. . |
| 2 276 155 | 9/1994 | United Kingdom . |
| WO 96/34423 | 10/1996 | WIPO . |

OTHER PUBLICATIONS

Patent Abstracts of Japan, vol. 96, No. 2, Feb. 29, 1996, JP 07 282798, Oct. 27, 1995.

Yuan Gao, et al., Journal of the Electrochemical Society, vol. 143, No. 1, pp. 100–114, "Synthesis and Characterization of $Li_{1-x}Mn_{2-x}O_4$ For Li–Ion Battery Applications", Jan. 1, 1996.

Yuan Gao, et al., Solid State Ionics, vol. 84, No. 1 &2, pp. 33–40, "Correlation Between the Growth of the 3.3 V Discharge Plateau and Capacity Fading in $Li_{1+x}Mn_{2-x}O_4$ Materials", Mar. 1996.

*Primary Examiner*—Stephen Kalafut
*Attorney, Agent, or Firm*—Oblon, Spivak, McClelland, Maier & Neustadt, P.C.

[57] ABSTRACT

A nonaqueous electrolyte secondary cell, wherein a lithium-containing metal oxide capable of binding and releasing lithium is used as a positive electrode, and a nonaqueous electrolyte containing a lithium salt is used as an electrolyte, in which a spinel type lithium manganese oxide which satisfies the formula:

$$Li[Mn_{2-x}Li_x]O_{4-\delta}$$

wherein $0 \leq x \leq 0.05$, and $-0.025 \leq \delta \leq 0.050$, and wherein the average valency of Mn is within a range of from 3.501 to 3.535, is used as the lithium-containing metal oxide.

13 Claims, 2 Drawing Sheets

NONAQUEOUS ELECTROLYTE SECONDARY CELL

The present invention relates to an improvement of a nonaqueous electrolyte secondary cell, particularly to an improvement of a positive electrode active material, and it is intended to improve the charge and discharge capacity and cycle characteristics of the cell.

As a positive electrode active material for a lithium secondary cell, $LiMn_2O_4$ has been proposed which is a double oxide of manganese and lithium, and a research thereon has been active. It has a merit of high voltage and high energy density, but it also has a drawback that the charge and discharge cycle life is short and has not yet been practically used for a cell. Heretofore, it has been proposed to modify the lithium manganese oxide to improve the cycle characteristics, for example, by using an excess amount of lithium to form $Li_{1+x}Mn_{2-x}O_4$ as disclosed in JP-A-7-282798 or by substituting a part of manganese for other metal such as Co or Cr to form $LiMn_{2-x}Co_xO_4$ or $LiMn_{2-x}Cr_xO_4$ as disclosed in JP-A-3-108261 or JP-A-3-219571. However, such modifying methods bring about a deterioration of the charge and discharge capacity. Therefore, it has been desired to develop a lithium manganese oxide having the cycle characteristics improved without lowering the charge and discharge capacity.

In view of the above problems, it is an object of the present invention to provide a lithium ion secondary cell employing as a positive electrode active material a spinel type lithium manganese oxide which is less susceptible to capacity deterioration due to the charge and discharge cycles, while maintaining the charge and discharge capacity at a high level.

The present invention provides a nonaqueous electrolyte secondary cell, wherein a lithium-containing metal oxide capable of binding and releasing lithium is used as a positive electrode, and a nonaqueous electrolyte containing a lithium salt is used as an electrolyte, in which a spinel type lithium manganese oxide which satisfies the formula:

$$Li[Mn_{2-x}Li_x]O_{4-\delta}$$

wherein $0 \leq x \leq 0.05$, and $-0.025 \leq \delta \leq 0.050$, and wherein the average valency of Mn is within a range of from 3.501 to 3.535, is used as the lithium-containing metal oxide.

In the accompanying drawings:

FIG. 1 is a vertical cross-sectional view of a coin type cell used for the test for the process for producing an active material for a nonaqueous electrolyte secondary cell in Examples of the present invention, wherein reference numeral 1 indicates a positive electrode, numeral 2 a casing, numeral 3 a separator, numeral 4 a negative electrode, numeral 6 a gasket and numeral 5 a sealing can.

Figure 2:
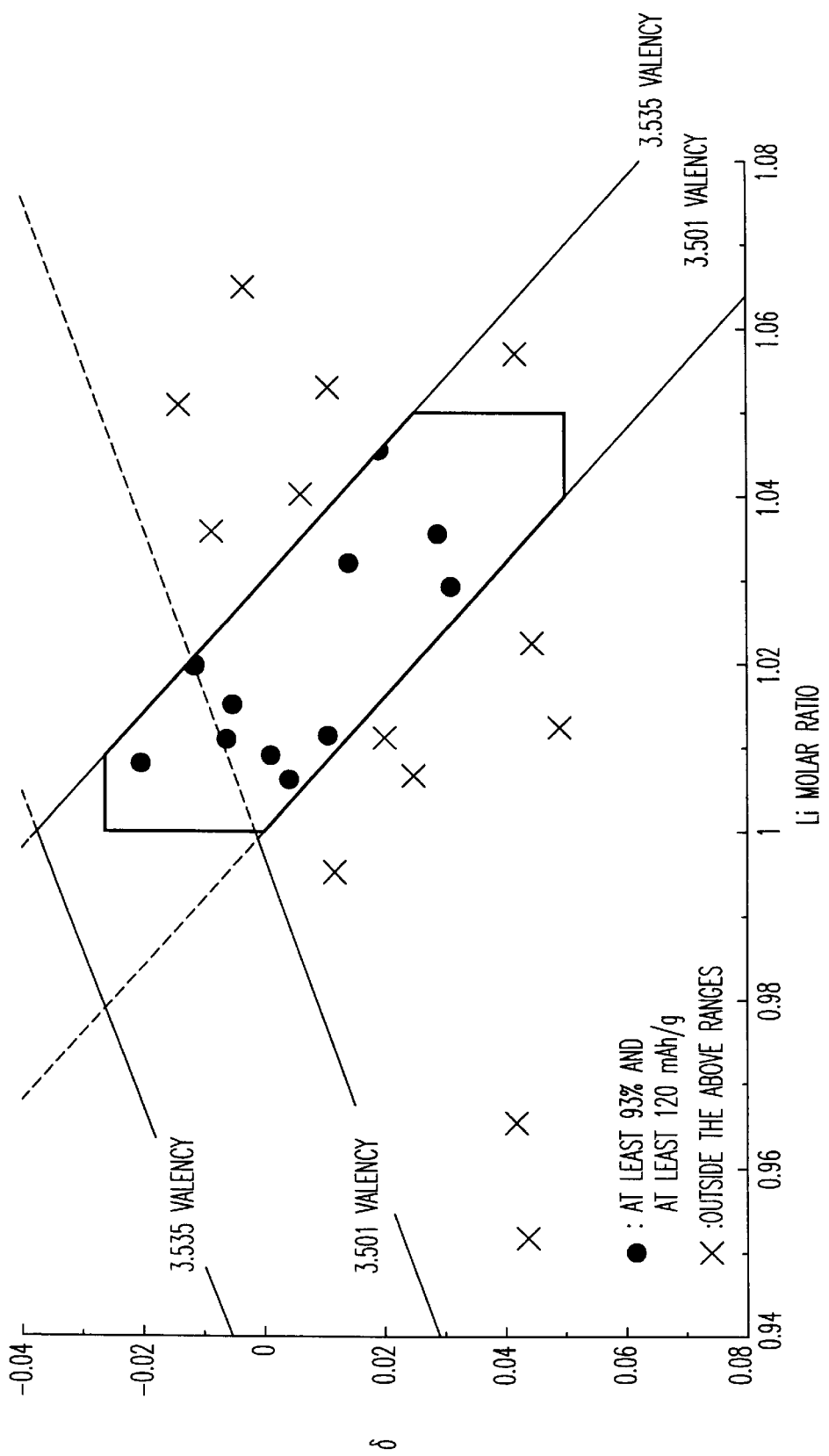

FIG. 2 is a graph showing the interrelation between the lithium molar ratio (1+x), δ and the average valency of manganese of the lithium manganese oxide obtained in each of Examples and Comparative Examples, and the initial discharge capacity and the cycle characteristics, wherein symbol ● represents an Example of the present invention wherein the initial discharge capacity is at least 120 mAh/g, and the capacity-retaining ratio after 100 cycles is at least 90%, symbol x represents a Comparative Example, the area within the broad solid line represents the scope of the lithium manganese oxide specified by the present invention.

Namely, according to the present invention, the above-identified spinel type lithium manganese oxide is used as the main active material of a positive electrode.

In the cell employing the spinel type lithium manganese oxide ($LiMn_2O_4$) as a positive electrode active. material, the charge and discharge reactions of the positive electrode are represented by the following formula.

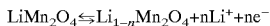

A spinel type lithium manganese oxide has a nature such that when subjected to the above charge and discharge reactions repeatedly, it readily loses the charge and discharge function. It is possible to prevent the deterioration of the charge and discharge function by substituting a part of Mn sites for a metal such as Li, Co or Cr. However, this method has a drawback that the charge and discharge capacity tends to be small. Therefore, the conventional method based on the substitution of cations can not be regarded as a fully satisfactory method for improvement. Therefore, the present inventors have conducted an extensive study paying a particular attention to the amount of oxygen in the spinel type lithium manganese oxide and have found that by a conventional method, an oxide having an oxygen deficiency is formed. Further, it has been found that the oxygen deficiency brings about a certain increase of the initial discharge capacity, but causes a deterioration of the charge and discharge cycle characteristics, and with an increase of the oxygen deficiency, the charge and discharge cycle characteristics decrease quantitatively. A change of the oxygen deficiency δ of $LiMn_2O_{4\pm\delta}$ by heat treating conditions, and an electrochemical characterization of lithium manganate having oxygen deficiency, are reported in J. Electrochem. Soc., Vol. 142, No. 7, July, 1995, but no disclosure is made with respect to a deterioration of the cycle characteristics due to the oxygen deficiency, and the lithium manganate subjected to the electrochemical measurement, does not fall within the scope of the present invention.

From the foregoing, a spinel type lithium manganese oxide excellent in the cycle characteristics while maintaining a high initial discharge capacity is preferably free from the oxygen deficiency δ with the value x in the above formula being as small as possible. Namely, the balance of x and δ should be optimized, and to maintain the balance, it is necessary to have the values of x and δ mutually restrained. Accordingly, the present inventors have realized that a result reflecting both x and δ is the average valency of Mn and have accomplished the present invention by defining the ranges of x, δ and the average valency of Mn.

The spinel type lithium manganese oxide of the formula:

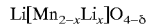

wherein $0 \leq x \leq 0.05$, and $-0.025 \leq \delta \leq 0.050$, and wherein the average valency of Mn is within a range of from 3.501 to 3.535, can be formed by calcining a mixture of a lithium compound and a manganese compound, as starting materials, whereby it is possible to obtain a product having a large initial discharge capacity in a 4 V region (initial discharge capacity>120 mAh/g, and excellent cycle characteristics (capacity-retaining ratio after 100 cycles>90%, preferably>93%).

In the present invention, x, δ and the average valency of Mn of $Li[Mn_{2-x}Li_x]O_{4-\delta}$ which is the positive electrode active material, are defined to be $0 \leq x \leq 0.05$, $-0.025 \leq \delta \leq 0.050$, and from 3.501 to 3.535 valency, respectively. These ranges represent the ranges of the initial state of the cell system before lithium is dedoped from the positive electrode active material. If these values depart from such ranges, it will be difficult to obtain the desired cell properties. Here, when the initial discharge capacity is important, the lower limit of x is preferably 0.005, and the upper limit of x is preferably 0.04, more preferably 0.02, most preferably 0.015. The lower limit of δ is preferably −0.015, more preferably −0.005, and the upper limit of δ is preferably 0.03, more preferably 0.012, most preferably 0.005. Likewise, the upper limit of the average valency of Mn is preferably 3.530, more preferably 3.515. On the other hand, when the capacity-retaining ratio after 100 cycles is important, the lower limit of x is preferably 0.01, more preferably 0.02, and the upper limit of x is preferably 0.045, more preferably 0.040. The lower limit of δ is preferably −0.015, more preferably −0.005, most preferably 0.005, and the upper limit of δ is preferably 0.04, more preferably 0.03. Likewise, the lower limit of the average valency of Mn is preferably 3.503, more preferably 3.505, most preferably 3.506.

The lithium compound to be used as the starting material, may, for example, be $Li_2CO_3$, $LiNO_3$, $LiOH$, $LiOH.H_2O$, $LiCl$, $CH_3COOLi$, or $Li_2O$. Among them, it is particularly preferred to employ $LiOH.H_2O$ or $LiOH$.

The manganese compound may, for example, be a manganese oxide such as $Mn_2O_3$ or $MnO_2$, or a manganese salt such as $MnCO_3$ or $Mn(NO_3)_2$. Among them, it is preferred to employ electrolytic manganese dioxide ($\gamma MnO_2$) or $Mn_2O_3$. In this case, $Mn_2O_3$ is preferably the one prepared by thermal decomposition of $MnCO_3$ or the one prepared by thermal decomposition of $\gamma$-$MnO_2$.

Then, in the present invention, the above Mn compound and the Li compound are mixed. Mixing may be carried out by a usual method. So long as uniform mixing can be done, any method may be employed, such as a method of mixing the two materials in a dry system or in a wet system, a method which comprises suspending the Mn compound in an aqueous Li salt solution and then drying the suspension, or a method of pulverizing and mixing the materials in a ball mill.

The lithium manganese oxide of the present invention is the one obtained by a special combination of specific starting materials and a specific production process. For example, the following processes may be mentioned, but the production method is not limited to such specific processes.

a) A process which comprises mixing electrolytic manganese dioxide ($\gamma$-$MnO_2$) and lithium hydroxide ($LiOH.H_2O$ or $LiOH$) as starting materials so that the molar ratio of Li to Mn will be preferably $0.500 \leq Li/Mn \leq 0.515$, heating the mixture at a heating temperature of at least 600° C., preferably from 600° to 850° C., preferably for at least 2 hours, in an atmosphere having an oxygen concentration of at least 10%, preferably at least 40% (atmospheric pressure or an oxygen pressure within a range of from 0.4 to 10 kgf/cm²), and then gradually cooling it to a temperature of not higher than 500° C. at a temperature-lowering rate of at most 20° C./min, preferably at most 10° C./min, more preferably from 0.2° C./min to 5° C./min.

b) A process which comprises preliminarily heating a mixture prepared by mixing lithium hydroxide ($LiOH.H_2O$ or $LiOH$) and dimanganese trioxide ($Mn_2O_3$) obtained by thermal decomposition of manganese carbonate so that the molar ratio of Li to Mn will preferably be $0.500 \leq Li/Mn \leq 0.515$, preferably at a temperature of from 400° to less than 600° C., then substantially calcining it at a heating temperature of at least 600° C., preferably from 600° to 850° C., in an atmosphere containing oxygen, preferably in an atmosphere having an oxygen concentration of at least 10%, more preferably at least 40% (atmospheric pressure or an oxygen pressure within a range of not higher than 10 kgf/cm²), and then gradually cooling it to a temperature of not higher than 500° C. at a temperature-lowering rate of at most 20° C./min, preferably at most 10° C./min, more preferably from 0.2° C./min to 5° C./min.

c) A process which comprises preliminarily calcining a mixture of $LiOH.H_2O$ or $LiOH$ and $Mn_2O_3$ at a temperature of from 400° to 600° C., then substantially calcining it at a temperature of at least 600° C., preferably from 600° to 850° C., in an atmosphere containing oxygen, preferably in an atmosphere having an oxygen concentration of at least 10%, more preferably at least 40% (atmospheric pressure or an oxygen pressure of at most 10 kgf/cm²), then gradually cooling it preferably to a temperature of not higher than 500° C. at a temperature-lowering rate of at most 20° C./min, preferably at most 10° C./min, more preferably from 0.2° C./min to 5° C./min, and then maintaining it at a constant temperature of from 400° to 500° C. for at least 1 hour in an atmosphere having an oxygen concentration of at least 10%, more preferably at least 40% (atmospheric pressure or an oxygen pressure of at most 10 kgf/cm²).

d) A process which comprises heating a mixture prepared by mixing dimanganese trioxide and lithium carbonate, or manganese carbonate and lithium hydroxide, or manganese carbonate and lithium carbonate, so that the molar ratio of Li to Mn will preferably be $0.500 \leq Li/Mn \leq 0.515$, in an atmosphere having an oxygen concentration of at least 10%, preferably at least 20% (atmospheric pressure or an oxygen pressure within a range of at most 10 kg/cm²) preferably for at least 2 hours so that the final heating temperature will be at least 600° C., preferably from 60° to 850° C., whereby the temperature-raising rate from the heating temperature of 400° C. to the final heating temperature is at most 40° C./hr, preferably at most 20° C./hr, more preferably from 2° C./hr to 10° C./hr (inclusive of a stepwise temperature-raising method so long as the overall temperature-raising rate falls within this range), and then gradually cooling it preferably to a temperature of not higher than 500° C. at a temperature-lowering rate of at most 20° C./min, preferably at most 10° C./min, more preferably from 0.2° C./min to 5° C./min.

Here, as a method for cooling the sample, rapid cooling is not desirable, since oxygen deficiency is likely to form by rapid cooling.

e) A process which comprises treating lithium manganese oxide with a solution containing an oxidizing substance. As the oxidizing substance, it is usual to employ the one having a standard electrode potential in water of at least 1.23 V. It is preferred to employ the one having a standard electrode potential in water of at least 1.3 V, particularly at least 1.4 V, so that it is capable of oxidizing an oxygen deficient lithium manganese oxide. However, if an oxidizing substance having a standard electrode potential being too high in water, is employed, the lithium manganese oxide is likely to be oxidized excessively, whereby lithium is likely to elute. Accordingly, as the oxidizing substance, it is usual to employ the one having a standard electrode potential of at most 2.00 V in water. It is particularly preferred to employ the one having a standard electrode potential of at most 1.8 V, more preferably at most 1.6 V, in water. Even with the one having a high standard electrode potential, the oxidizing power can be lowered by using it at a low concentration, but such a method is not advantageous, since the reaction rate tends to be low, and it will take a long time for the treatment. Usually, an inorganic oxide such as potassium permanganate (standard electrode potential: 1.51 V), lithium permanganate, sodium permanganate, potassium persulfate (standard electrode potential: 2.01 V) or potassium dichromate (standard electrode potential: 1.29 V), or a peroxide such as hydrogen peroxide (standard electrode potential: 1.776 V) may, for example, be used.

f) A process which comprises mixing nonaqueous solutions of a lithium salt and a manganese salt, adding a nonaqueous solution of a dicarboxylic acid to this mixed solution for coprecipitation, then adjusting the pH of this coprecipitation solution with a nonaqueous basic solvent to obtain a coprecipitated powder comprising lithium dicarboxylate and manganese dicarboxylate having the precipitation ratio controlled, and calcining this coprecipitated powder. The process employing this coprecipitation method has two merits. Namely, by coprecipitation, mixing of the lithium material and the manganese material will be uniform, and although the reason is not clearly understood, especially when coprecipitated with dicarboxylic acid, a lithium metal-containing oxide having a composition within the scope of the present invention can readily be obtained, whereby it is possible to obtain a product which is excellent in both the capacity and the cycle characteristics as a secondary cell.

The lithium salt to be used here, may, for example, be lithium nitrate, lithium sulfate, lithium chloride or lithium acetate. Likewise, the manganese salt may, for example, be manganese nitrate, manganese sulfate, manganese chloride or manganese acetate.

The reason for employing a nonaqueous solvent as the solvent for precipitation is that if oxalic acid is used, for example, the resulting lithium oxalate is readily soluble in water (solubility: 8 g/100 g of water at 19.5° C.). Accordingly, it may be a solvent in which the dicarboxylic acid as a precipitating agent is readily soluble and in which the formed dicarboxylate is hardly soluble. It is usually preferred to employ an alcohol such as ethanol. The reason is that handling is easy, and it is capable of readily dissolving various metal salts and oxalic acid as the precipitating agent.

The dicarboxylate solution preferably contains water as little as possible in order to prevent dissolution of lithium dicarboxylate, but it may not necessarily be completely nonaqueous.

The reason for employing a dicarboxylic acid (preferably anhydride) as the precipitating agent, is that it forms a fine hardly soluble salt with almost any kind of metal, and control of the precipitation operation (the temperature and pH of the solution) is thereby easy. Further, it can all be discharged as carbon dioxide gas by calcination, whereby a step of removing residual ions can be omitted.

As the dicarboxylic acid, a saturated dicarboxylic acid such as oxalic acid, malonic acid, succinic acid, glutaric acid or adipic acid, an unsaturated dicarboxylic acid such as maleic acid or fumaric acid, or an aromatic dicarboxylic acid such as phthalic acid, may, for example, be employed. Particularly preferred is oxalic acid.

The reason for employing a nonaqueous basic solvent as a pH-controlling liquid in this method, is that it is thereby possible to avoid dissolution of lithium oxalate by inclusion of water. The precipitation ratio can be controlled by the pH adjustment, and the ratio may suitably be determined depending upon the dicarboxylic acid used and the types of metals to be precipitated. For example, in a case where Li and Mn are to be coprecipitated by means of oxalic acid, the pH is preferably within a range of from 3 to 9. As such a nonaqueous basic solvent, an amine is preferred.

The amine may, for example, be ammonia, methylamine, ethylamine, diethylamine, diisopropylamine, pyrrolidine, triethylamine, butylamine, dibutylamine, tributylamine, N-methylpyrrolidine, cyclohexylamine, 1,4-butanediamine, tetramethylguanidine, an arylamine or pyridine.

The preliminary calcination of the coprecipitated powder comprising lithium dicarboxylate and manganese dicarboxylate in a molar ratio of Li/Mn=about ½ thus obtained, is carried out in a temperature range of from 10° to 600° C., preferably from 350° to 450° C. for from a few hours to a few tens hours for thermal decomposition. Then, in an oxygen atmosphere, the substantial calcination is carried out within a temperature range of from 600° to 900° C., preferably from 700° to 800° C., for from a few hours to a few tens hours. Also in this case, gradual cooling is preferred as the cooling method.

As a negative electrode material to be used in combination with such a positive electrode having the above-described specific spinel type lithium manganese oxide, any material which is commonly used for nonaqueous electrolyte secondary cells of this type, may be employed. For example, it may be lithium or a lithium alloy, but is preferably a compound which is more safe and which is capable of binding and releasing lithium, such as carbon material. This carbon material is not particularly limited and may, for example, be graphite, coal-base coke, petroleum-base coke, a carbide of coal-base pitch, a carbide of petroleum-base pitch, needle coke, pitch coke, a carbide of a phenol resin or a crystal cellulose, or a carbon material obtained by partially graphitizing such a carbide, furnace black, acetylene black, or a pitch-base carbon fiber.

The negative electrode may be the one prepared by slurrying the negative active material and a binder with a solvent, followed by coating and drying the slurry.

The positive electrode may be the one prepared by slurrying the electrode active material, a binder and an electroconductive agent with a solvent, followed by coating and drying the slurry.

The binder for the negative electrode material or the positive electrode material may, for example, be polyvinylidene fluoride, polytetrafluoroethylene, EPDM (ethylene-propylene-diene three component copolymer), SBR (styrene-butadiene rubber), NBR (acrylonitrile-butadiene rubber) or fluorine rubber. However, the binder is not limited to such specific examples.

As the electroconductive agent for the positive electrode, fine particles of graphite, carbon black such as acetylene black or fine particles of amorphous carbon such as needle coke, may, for example, be used. However, the electroconductive agent is not limited to such specific examples.

As a separator, a fine porous polymer film is employed, which is made, for example, of nylon, cellulose acetate, nitrocellulose, polysulfone, polyacrylonitrile, polyvinylidene fluoride, polypropylene, polyethylene or a polyolefin polymer such as polybutene. The chemical and electrochemical stability of the separator is an important factor. From this viewpoint, a polyolefin type polymer is preferred. From the viewpoint of the self locking temperature which is one of purposes of a cell separator, the separator is preferably made of polyethylene.

In the case of a polyethylene separator, it is preferably made of an ultra high molecular weight polyethylene from the viewpoint of the high temperature dimensional stability, and the lower limit of the molecular weight is preferably 500,000, more preferably 1,000,000, most preferably 1,500,000. On the other hand, the upper limit of the molecular weight is preferably 5,000,000, more preferably 4,000,000, most preferably 3,000,000. If the molecular weight is too high, the fluidity tends to be so low that pores of the separator may not sometimes be closed even when heated.

As an electrolyte, an electrolyte may be employed which is prepared by dissolving e.g. a lithium salt as an electrolyte material in an organic solvent.

The organic solvent is not particularly limited and may, for example, be a carbonate, an ether, a ketone, a sulforan compound, a lactone, a nitrile, a chlorinated hydrocarbon, an ether, an amine, an ester, an amide or a phosphoric acid ester compound. Typical examples of these solvents include propylene carbonate, ethylene carbonate, vinylene carbonate, tetrahydrofuran, 2-methyltetrahydrofuran, 1,4-dioxane, 4-methyl-2-pentanone, 1,2-dimethoxyethane, 1,2-diethoxyethane, 1,2dimethoxyethane, γ-butyrolactone, 1,3-dioxolan, 4-methyl-1,3-dioxolan, diethyl ether, sulforane, methylsulforane, acetonitrile, propionitrile, benzonitrile, butyronitrile, valeronitrile, 1,2-dichloroethane, dimethylformamide, dimethylsulfoxide, trimethyl phosphate, and triethyl phosphate. These solvents may be used alone or in combination as a mixture of two or more of them.

As the electrolyte, any one of conventional electrolytes may be employed, such as $LiClO_4$, $LiAsF_6$, $LiPF_6$, $LiBF_4$, $LiB(C_6H_5)_4$, LiCl, LiBr, $CH_3SO_3Li$ or $CF_3SO_3Li$.

The electrolyte may not be limited to such a nonaqueous electrolyte solution and may be a solid electrolyte.

Now, the present invention will be described in further detail with reference to Examples. However, it should be understood that the present invention is by no means restricted to such specific Examples.

Table 1 shows Examples and Comparative Examples of the present invention. FIG. 2 is a graph showing the interrelation between the lithium molar ratio (1+x), δ and the average valency of manganese of the lithium manganese oxide obtained in each of Examples and Comparative Examples, and the initial discharge capacity and the cycle characteristics. Symbol ● represents an Example and x represents a Comparative Example. Here, metal Li is used as the negative electrode for evaluation of the initial discharge capacity and the capacity-retaining ratio, and the initial discharge capacity is calculated per gram of the positive electrode active material.

EXAMPLE 1

$LiOH.H_2O$ and γ-$MnO_2$ were mixed for 4 hours by an automatic mortar in a ratio of Li/Mn=½. Then, the mixture was heated in oxygen at 750° C. for 24 hours and then gradually cooled to 450° C. at a rate of 0.5° C./min.

EXAMPLE 2

$LiOH.H_2O$ and γ-$MnO_2$ were mixed for 8 hours by an automatic mortar in a ratio of Li/Mn=½. Then, the mixture was heated in oxygen at 750° C. for 24 hours and then gradually cooled to 450° C. at a rate of 0.5° C./min.

EXAMPLE 3

$LiOH.H_2O$ and $Mn_2O_3$ obtained by thermal decomposition of $MnCO_3$, were mixed in a wet system by means of a mortar in a ratio of Li/Mn=½. Then, the mixture was preliminarily calcined in atmospheric air at 500° C. for 24 hours, then substantially calcined in atmospheric air at 750° C. for 24 hours, and then left to cool by switching off the power source of the heating furnace. The cooling rate to 450° C. at that time was 10° C./min.

EXAMPLE 4

$LiOH.H_2O$ and $Mn_2O_3$ obtained by thermal decomposition of $MnCO_3$, were mixed in a wet system by means of a mortar in a ratio of Li/Mn=½. Then, the mixture was preliminarily calcined in atmospheric air at 500° C. for 24 hours, then substantially calcined in oxygen at 750° C. for 24 hours, then maintained in oxygen at 450° C. for 24 hours, and then left to cool by switching off the power source of the heating furnace. The cooling rate to 450° C. at that time was 10° C./min.

EXAMPLE 5

$LiOH.H_2O$ and $Mn_2O_3$ obtained by heating γ-$MnO_2$ in atmospheric air at 750° C. for 24 hours, were used as starting materials. The starting materials were blended so that the atomic ratio of lithium to manganese became 1:2. Ethanol was added to this blend, and the mixture was well mashed in a mortar to obtain a uniform mixture. The obtained mixture was heated at 750° C. for 24 hours in atmospheric air and then left to cool by switching off the power source of the heating furnace. The cooling rate to 450° C. at that time was 10° C./min.

EXAMPLE 6

$LiOH.H_2O$ and $Mn_2O_3$ obtained by heating γ-$MnO_2$ at 750° C. for 24 hours in atmospheric air, were used as starting materials. The starting materials were blended so that the atomic ratio of lithium to manganese became 1:2. Ethanol was added to this blend, and the mixture was well mashed in a mortar to obtain a uniform mixture. The obtained mixture was preliminarily calcined in atmospheric air at 500° C. for 24 hours, then substantially calcined in atmospheric air at 800° C. for 24 hours, and then gradually cooled to 450° C. at a rate of 0.2° C./min.

EXAMPLE 7

Ethanol solutions of 1 mol/l of $LiNO_3$ and 1 mol/l of $Mn(NO_3)_2.6H_2O$ having their factors determined, were mixed so that the molar ratio of Li/Mn became ½. The solution thereby obtained was stirred, and 1.5 equivalents of an oxalic acid ethanol solution was gradually added thereto. This coprecipitation solution was stirred for 2 hours and then adjusted to pH 6.87 with triethylamine, then further stirred for 3 hours and left to stand for coprecipitation. Then, filtration and drying were carried out to obtain a coprecipitated powder (a powder mixture of $Li_2(C_2O_4)$ and $Mn(C_2O_4)$). The obtained coprecipitated powder was calcined to obtain $LiMn_2O_4$. The calcining conditions were such that firstly thermal decomposition was carried out in atmospheric air at a temperature of 400° C. for 6 hours at a temperature-raising rate of 5° C./min, then calcination was carried out in atmospheric air at a temperature of 750° C. for 24 hours at a temperature-raising rate of 5° C./min, and thereafter gradual cooling to 450° C. was carried out at a rate of 0.2° C./min, and then the product was maintained for 6 hours, and then cooled to room temperature at a rate of 5° C./min.

EXAMPLE 8

Ethanol solutions of 1 mol/l of $LiNO_3$ and 1 mol/l of $Mn(NO_3)_2.6H_2O$ having their factors determined, were mixed so that the molar ratio of Li/Mn became ½. The solution thereby obtained was stirred, and 1.5 equivalents of an oxalic acid ethanol solution was gradually added thereto. This coprecipitation solution was stirred for 2 hours, then adjusted to pH 8.12 with triethylamine, further stirred for 3 hours, and then left to stand for coprecipitation. Thereafter, filtration and drying were carried out to obtain a coprecipitated powder (a powder mixture of $Li_2(C_2O_4)$ and $Mn(C_2O_4)$). The obtained coprecipitated powder was calcined to obtain $LiMn_2O_4$. The calcining conditions were such that firstly, thermal decomposition was carried out in atmospheric air at 400° C. for 6 hours at a temperature-raising rate of 5° C./min, then calcination was carried out in atmospheric air at a temperature of 750° C. for 24 hours at a temperature-raising rate of 5° C./min, then gradual cooling to 450° C. was carried out at a rate of 0.2° C./min, and then the product was maintained for 6 hours and then cooled to room temperature at a rate of 5° C./min.

EXAMPLE 9

$LiOH.H_2O$ and $MnCO_3$ were mixed in a wet system by means of a mortar in a ratio of Li/Mn=½. Then, the mixture was stepwisely heated in atmospheric air at temperatures of 450°, 500°, 550° and 600° C. each for 12 hours. Then, it was substantially calcined at 750° C. for 48 hours in atmospheric air, and then gradually cooled to 450° C. at a rate of 0.2° C./min.

EXAMPLE 10

$LiOH-H_2O$ and chemically synthesized $MnO_2$ (CMD) were mixed in a wet system by means of a mortar in a ratio of Li/Mn=½. Then, the mixture was preliminarily calcined in atmospheric air at 500° C. for 24 hours, then substantially calcined in atmospheric air at 800° C. for 24 hours and then gradually cooled to 450° C. at a rate of 0.2° C./min.

EXAMPLE 11

$Li_2CO_3$ and $MnCO_3$ were mixed in a wet system by means of a mortar in a ratio of Li/Mn=½. Then, the mixture was stepwisely heated in atmospheric air at temperatures of 450°, 500°, 550° and 600° C. each for 12 hours, and then substantially calcined at 750° C. for 48 hours in atmospheric air, and then gradually cooled to 450° C. at a rate of 0.2° C./min.

COMPARATIVE EXAMPLE 1

$Li_2CO_3$ and $Mn_2O_3$ were mixed in a wet system by means of a mortar in a ratio of Li/Mn=½. Then, the mixture was preliminarily calcined in atmospheric air at 650° C. for 24 hours, then substantially calcined in atmospheric air at 750° C. for 24 hours, and then left to cool by switching off the power source of the heating furnace. The cooling rate to 450° C. at that time was 10° C./min.

COMPARATIVE EXAMPLE 2

$LiOH.H_2O$ and $\gamma$-$MnO_2$ were mixed in a wet system by means of a mortar in a ratio of Li/Mn=½. The mixture was preliminarily calcined in atmospheric air at 500° C. for 24 hours, then substantially calcined in oxygen at 750° C. for 24 hours, and then rapidly cooled (temperature-lowering rate of about 50° C./min). The product was again heated in nitrogen at 575° C. for 24 hours, whereupon the sample was withdrawn from the furnace for rapid cooling (temperature-lowering rate: about 50° C./min).

COMPARATIVE EXAMPLE 3

$Li_2CO_3$ and $\gamma$-$MnO_2$ were mixed in a wet system by means of a mortar in a ratio of Li/Mn=½. The mixture was preliminarily calcined in atmospheric air at 650° C. for 24 hours, then substantially calcined in atmospheric air at 750° C. for 24 hours, and then left to cool by switching off the power source of the heating furnace. The cooling rate to 450° C. at that time was 10° C./min.

COMPARATIVE EXAMPLE 4

$LiOH.H_2O$ and $\gamma$-$MnO_2$ were mixed in a wet system by means of a mortar in a ratio of Li/Mn=½. Then, the mixture was preliminarily calcined in atmospheric air at 500° C. for 24 hours, then substantially calcined in oxygen at 750° C. for 24 hours, followed by rapid cooling (temperature-lowering rate: about 50° C./min). This sample was again heated in nitrogen at 550° C. for 24 hours, and then the sample was taken out from the furnace for rapid cooling (temperature-lowering rate: about 50° C./min).

COMPARATIVE EXAMPLE 5

$Li_2CO_3$ and $MnCO_3$ were mixed in a wet system by means of a mortar in a ratio of Li/Mn=½. Then, the mixture was preliminarily calcined in atmospheric air at 650° C. for 24 hours, then substantially calcined in atmospheric air at 750° C. for 24 hours and then left to cool by switching off the power source of the heating furnace. The cooling rate to 450° C. at that time was 10° C./min.

COMPARATIVE EXAMPLE 6

$LiOH.H_2O$ and $Mn_2O_3$ obtained by heating $\gamma$-$MnO_2$ at 750° C. for 24 hours in atmospheric air, were used as starting materials. The starting materials were blended so that the atomic ratio of lithium and manganese became 1:2. Ethanol was added to this blend, and the mixture was well mashed in a mortar to obtain a uniform mixture. The obtained mixture was heated at 750° C. for 24 hours in an oxygen stream and then gradually cooled to 450° C. at a rate of 0.5° C./min.

COMPARATIVE EXAMPLE 7

$LiOH.H_2O$ and $MnCO_3$ were mixed in a wet system by means of a mortar in a ratio of Li/Mn=½. Then, the mixture was preliminarily calcined in atmospheric air at 500° C. for 24 hours, then substantially calcined in atmospheric air at 750° C. for 24 hours and then left to cool by switching off the power source of the heating furnace. The cooling rate to 450° C. at that time was 10° C./min.

COMPARATIVE EXAMPLE 8

$LiOH.H_2O$ and $\gamma$-$MnO_2$ were mixed in a wet system by means of a mortar in a ratio of Li/Mn=½. Then, the mixture was preliminarily calcined in atmospheric air at 400° C. for 6 hours, then substantially calcined in atmospheric air at 750° C. for 24 hours, and then gradually cooled to 450° C. at a rate of 0.2° C./min.

COMPARATIVE EXAMPLE 9

Lithium manganate manufactured by Mitsui Mining and Smelting Co., Ltd., was used.

COMPARATIVE EXAMPLE 10

Lithium manganate manufactured by Nippon Jukagaku Kogyo K.K., was used.

COMPARATIVE EXAMPLE 11

$Li_2CO_3$ and $Mn_2O_3$ were mixed in a wet system by means or a ball mill in a ratio of Li/Mn=½. Then, the mixture was preliminarily calcined in atmospheric air at 750° C. for 24 hours, then substantially calcined in an oxygen stream at 870° C. for 24 hours and then gradually cooled to room temperature at a rate of 3° C./min.

COMPARATIVE EXAMPLE 12

Lithium manganate manufactured by CYPRESS FOOTE Co., was used.

COMPARATIVE EXAMPLE 13

$Li_2CO_3$ and $\gamma$-$MnO_2$ were mixed in a wet system by means of a mortar in a ratio of Li/Mn=½. Then, the mixture was stepwisely heated in atmospheric air at temperatures of 450°, 500°, 550° and 600° C. each for 12 hours, then substantially calcined at 750° C. for 48 hours in atmospheric air and then gradually cooled to 450° C. at a rate of 0.2° C./min.

The analytical values of the compositions in Examples and Comparative Examples in Table 1 were determined by the following methods.

Analysis of total amount of Li

After vacuum drying treatment at 50° C. for 1 hour, a spinel type lithium manganese oxide was accurately weighed and dissolved in a hydrochloric acid solution under heating to prepare a sample solution. Using an atomic absorption apparatus, the Li concentration was obtained by a calibration curve method, whereby the Li content per unit weight was calculated.

Analysis of total amount of Mn: EDTA chelate titration

After vacuum drying treatment at 50° C. for 1 hour, a spinel type lithium manganese oxide was accurately weighed and dissolved in a hydrochloric acid solution under heating to obtain a sample solution. The solution was sampled by a whole pipette into a conical beaker, and a slightly excess amount of a 0.01M EDTA solution was added thereto. Then, pure water was added to adjust the total amount to 75 ml, and the pH was adjusted to 10 by adding suitable amounts of 8N NaOH aqueous solution and an ammonia buffer solution. Pure water was added to adjust the total amount to 10 ml, and then a BT indicator was dropwise added. Using a 0.01M Mg ion standard solution as a titration solution, titration was carried out by a micro burette. A point at which the color of the BT indicator changed from blue to red, was taken as the end point. From the titration result, the Mn content per unit weight was calculated.

Iodometry

After vacuum drying treatment at 50° C. for 1 hour, a spinel type lithium manganese oxide was accurately weighed and put into a conical beaker. Then, a small excess amount of a KI saturated solution and concentrated hydrochloric acid were added in this order to completely dissolve the oxide. Then, pure water was added thereto to bring the total amount to 10 ml. Using a 0.1N sodium thiosulfate solution as a titration solution, titration was carried out by a micro burette. Immediately before the end point, a predetermined amount of a starch solution was added, and a point at which the color of the solution changed from a pale purple color to colorless was taken as the end point. From the titration results, equivalent amounts of $Mn^{3+}$ and $Mn^{4+}$ per unit weight were determined.

Calculation of the valency of Mn

The Mn valency of a spinel type lithium manganese oxide was obtained from the following calculation from the analytical results of the total amount of Mn by the EDTA chelate titration method and the analytical results of the equivalent amounts of $Mn^{3+}$ and $Mn^{4+}$ by the iodometry method.

When $Mn^{4+}$, $Mn^{3+}$ and $Mn^{2+}$ are present in amounts of k, m and n mol per 0.1 g of a sample, respectively, the following reactions proceed by the iodometry method:

Reaction by $Mn^{4+}$

(2)

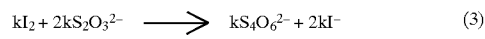
(3)

Reaction by $Mn^{3+}$

(4)

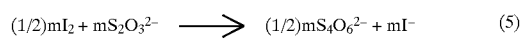
(5)

Reaction by $Mn^{2+}$

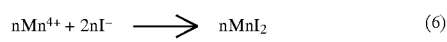
(6)

$Mn^{2+}$ does not liberate $I_2$ and accordingly does not react with sodium thiosulfate.

From the foregoing, by the iodometry, a titration value corresponding to (2k+m) mol will be obtained.

On the other hand, in the EDTA chelate titration, a titration value corresponding to (k+m+n) mol will be obtained.

Accordingly, the Mn value will be obtained by the following formula:

$$\begin{aligned}
\text{Mn value} &= 4 \times k/(k+m+n) + 3 \times m/(k+m+n) + \\
&\quad 2 \times n/(k+m+n) \\
&= (4k+3m+2n)/(k+m+n) \\
&= 2 + (2k+m)/(k+m+n) \\
&= 2 + (\text{result of idometry})/(\text{result of} \\
&\quad \text{EDTA chelate titration})
\end{aligned} \quad (7)$$

As is evident from the formula (7), the valency of Mn can be calculated from the results of the EDTA chelate titration and the iodometry.

Determination of the amount of oxygen

The compositional ratio of Li to Mn was calculated from the results of the Li analysis and the Mn analysis as described above. When the molar ratio of Li/Mn is at least ½, the composition of the product will crystallographically become $Li(Mn_{2-x}Li_x)O_{4-\delta}$, and therefore, the compositional ratio was obtained so that the sum would be 3.

When the molar ratio of Li/Mn is smaller than ½, the composition of the product will crystallographically become $Li_zMn_2O_{4-\delta}$, and therefore, the compositional ratio was obtained on the basis that the molar amount of Li was x when the molar amount of Mn was fixed at 2.

From the Mn valency obtained from the molar ratio of Li to Mn, the oxygen amount was calculated by using the rule of electrical neutrality.

From the powder-X-ray diffraction, all of the samples prepared in Examples and Comparative Examples were confirmed to be a single phase of a cubic system.

Now, a process for preparing a cell and the charge and discharge conditions will be described.

A positive electrode active material prepared or procured as identified in Table 1, acetylene black as an electroconductive agent and a polyethylene trifluoride resin as a binder, were mixed in a weight ratio of 75:20:5 to obtain a positive electrode blend material. Further, 0.1 g of the positive electrode blend material was formed by press molding under a pressure of 1 ton/cm² to obtain a positive electrode having a diameter of 16 mm. Referring to FIG. 1, a porous polypropylene film as a separator 3 was put on the positive electrode 1. A lithium plate having a diameter of 16 mm and a thickness of 0.4 mm was pressed against a sealing can 6 having a propylene gasket 5 attached. As a nonaqueous electrolyte, a solution of ethylene carbonate+1,2dimethoxyethane (50 vol %: 50 vol %) having 1 mol/l of lithium perchlorate dissolved therein, was used, and this electrolyte was put on the separator 3 and the negative electrode 4. Thereafter, the cell was sealed.

Comparison of the charge and discharge cycle characteristics of the cells prepared in such a manner, was carried out. The charge and discharge cycle test in the present invention was carried out by conducting constant current charging and discharging at a charge and discharge current of 2 mA within a voltage range of from 4.35 V to 3.2 V.

TABLE 1

| | Compositional ratio of the lithium manganese oxide | | Oxygen deficiency δ | discharge Average | Initial ratio after capacity | Capacity-retaining 100 cycles |
|---|---|---|---|---|---|---|
| | Li | Mn | *1 | valency of Mn | (mAh/g) | *2 (%) |
| Example 1 | 1.014 | 1.986 | −0.005 | 3.523 | 121 | 94.2 |
| Example 2 | 1.011 | 1.989 | −0.006 | 3.520 | 124 | 93.5 |
| Example 3 | 1.007 | 1.993 | 0.003 | 3.506 | 129 | 93.6 |
| Example 4 | 1.009 | 1.991 | 0.002 | 3.509 | 129 | 94.6 |
| Example 5 | 1.045 | 1.955 | 0.022 | 3.535 | 120 | 96.7 |
| Example 6 | 1.032 | 1.968 | 0.015 | 3.525 | 121 | 97.5 |
| Example 7 | 1.009 | 1.991 | −0.017 | 3.528 | 130 | 93.1 |
| Example 8 | 1.019 | 1.981 | −0.010 | 3.534 | 129 | 94.6 |
| Example 9 | 1.010 | 1.990 | 0.009 | 3.504 | 122 | 95.9 |
| Example 10 | 1.035 | 1.965 | 0.030 | 3.514 | 120 | 95.4 |
| Example 11 | 1.029 | 1.971 | 0.032 | 3.504 | 122 | 95.9 |
| Comparative Example 1 | 0.995 | 2.000 | 0.012 | 3.490 | 120 | 82.8 |
| Comparative Example 2 | 1.012 | 1.988 | 0.049 | 3.466 | 125 | 84.8 |
| Comparative Exainple 3 | 1.040 | 1.960 | 0.007 | 3.544 | 115 | 93.9 |
| Comparative Example 4 | 1.022 | 1.978 | 0.045 | 3.482 | 128 | 85.9 |
| Comparative Example 5 | 1.053 | 1.947 | 0.011 | 3.557 | 104 | 93.0 |
| Comparative Example 6 | 1.036 | 1.964 | −0.008 | 3.554 | 118 | 96.6 |
| Comparative Example 7 | 1.051 | 1.949 | −0.013 | 3.579 | 118 | 96.8 |
| Comparative Example 8 | 1.065 | 1.935 | −0.002 | 3.586 | 114 | 93.0 |
| Comparative Example 9 | 1.057 | 1.943 | 0.042 | 3.530 | 113 | 94.7 |
| Comparative Example 10 | 1.007 | 1.993 | 0.026 | 3.477 | 110 | 87.5 |
| Comparative Example 11 | 1.011 | 1.989 | 0.020 | 3.494 | 118 | 67.4 |
| Comparative Example 12 | 0.951 | 2.000 | 0.044 | 3.470 | 114 | 74.9 |
| Comparative Example 13 | 0.965 | 2.000 | 0.042 | 3.475 | 115 | 87.0 |

*1) Oxygen deficiency δ is represented by a positive value when oxygen is deficient and by a negative value when oxygen is excessive.
*2) The initial discharge capacity was taken as 100%.

It is evident that in Examples of the present invention, the initial discharge capacity is large (initial discharge capacity>120 mAh/g), and the cycle characteristics are excellent (capacity-retaining ratio after 10 cycles>90%, preferably>93%).

In Examples, metal lithium was used as a negative electrode material of the cells. Similar results were obtained also in a case where a lithium alloy or a compound capable of binding or releasing lithium was used.

As described in the foregoing, by using a spinel type lithium manganese oxide of the formula:

Li[Mn$_{2-x}$Li$_x$]O$_{4-δ}$ wherein $0 \leq x \leq 0.05$, and $-0.025 \leq δ \leq 0.050$, and wherein the average valency of Mn is within a range of from 3.501 to 3.535, as a positive electrode active material, it is possible to obtain a cell having a large charge and discharge capacity and having cycle characteristics improved. As a result, it is possible to use an inexpensive lithium manganese oxide material as the positive electrode material, and it is possible to supply a high performance, safe and inexpensive lithium ion secondary cell for a wide range of applications. Therefore, the industrial value of the present invention is significant.

What is claimed is:

1. A nonaqueous electrolyte secondary cell, wherein a lithium-containing metal oxide capable of binding and releasing lithium is used as a positive electrode, and a nonaqueous electrolyte containing a lithium salt is used as an electrolyte, in which a spinel type lithium manganese oxide which satisfies the formula:

$Li[Mn_{2-x}Li_x]O_{4-\delta}$ wherein $0 \leq x \leq 0.05$, and $-0.005 \leq \delta \leq 0.050$, and wherein the average valency of Mn is within a range of from 3.501 to 3.535, is used as the lithium-containing metal oxide.

2. The nonaqueous electrolyte secondary cell according to claim 1, wherein the lithium-containing metal oxide satisfies $0 \leq x \leq 0.02$.

3. The nonaqueous electrolyte secondary cell according to claim 1, wherein the lithium-containing metal oxide satisfies $0.005 \leq \delta \leq 0.012$.

4. The nonaqueous electrolyte secondary cell according to claim 1, wherein the lithium-containing metal oxide satisfies $0.01 \leq x \leq 0.05$.

5. The nonaqueous electrolyte secondary cell according to claim 1, wherein the lithium-containing metal oxide satisfies $0.005 \leq \delta \leq 0.04$.

6. The nonaqueous electrolyte secondary cell according to claim 1, wherein the average valency of Mn in the lithium-containing metal oxide is within a range of from 3.505 to 3.535.

7. The nonaqueous electrolyte secondary cell according to claim 1, wherein the lithium-containing metal oxide is a lithium-containing metal oxide prepared by heating and reacting lithium hydroxide and electrolytic manganese dioxide ($\gamma$-$MnO_2$), as starting materials.

8. The nonaqueous electrolyte secondary cell according to claim 1, wherein the lithium-containing metal oxide is a lithium-containing metal oxide prepared by heating lithium hydroxide and dimanganese trioxide obtained by thermal decomposition of electrolytic manganese dioxide, as starting materials.

9. The nonaqueous electrolyte secondary cell according to claim 1, wherein the lithium-containing metal oxide is a lithium-containing metal oxide prepared by heating and reacting lithium hydroxide and dimanganese trioxide obtained by thermal decomposition of manganese carbonate, as starting materials.

10. A process for producing lithium manganese oxide for a positive electrode for a nonaqueous electrolyte secondary cell, which comprises heating a mixture comprising electrolytic manganese dioxide ($\gamma$-$MnO_2$) and lithium hydroxide ($LiOH.H_2O$ or LiOH), as starting materials, at a heating temperature of at least 600° C. in an atmosphere having an oxygen pressure within a range of from 0.4 to 10 kgf/cm$^2$, and then gradually cooling it to a temperature of not higher than 500° C. at a temperature-lowering rate of 20° C./min.

11. A process for producing lithium manganese oxide for a positive electrode for a nonaqueous electrolyte secondary cell, which comprises preliminarily calcining a mixture of lithium hydroxide ($LiOH.H_2O$ or LiOH) and dimanganese trioxide ($Mn_2O_3$) obtained by thermal decomposition of manganese carbonate, at a temperature of from 400° C. to less than 600° C., then calcining it at a heating temperature of at least 600° C. in an atmosphere containing oxygen, and then gradually cooling it to a temperature of not higher than 500° C. at a temperature-lowering rate of 20° C./min.

12. A process for producing lithium manganese oxide for a positive electrode for a nonaqueous electrolyte secondary cell, which comprises preliminarily calcining a mixture of lithium hydroxide ($LiOH.H_2O$ or LiOH) and dimanganese trioxide ($Mn_2O_3$) at a temperature of from 400° C. to less than 600° C., then calcining it at a temperature of at least 600° C. in an atmosphere containing oxygen, and then maintaining it at a constant temperature within a range of from 400° to 500° C. in an oxygen atmosphere for at least 1 hour.

13. A process for producing lithium manganese oxide for a positive electrode for a nonaqueous electrolyte secondary cell, which comprises mixing nonaqueous solutions of a lithium salt and a manganese salt, adding a nonaqueous solution of a dicarboxylic acid to this mixed solution for coprecipitation, then adjusting the pH of this coprecipitation solution with a nonaqueous basic solvent to obtain a coprecipitated powder comprising lithium dicarboxylate and manganese dicarboxylate having the precipitation ratio controlled, and calcining this coprecipitated powder.

* * * * *